(12) United States Patent
Harris et al.

(10) Patent No.: US 11,645,661 B2
(45) Date of Patent: May 9, 2023

(54) DETECTING SUPPLIER FRAUD FROM DIGITAL TRANSACTIONAL DATA

(71) Applicant: Coupa Software Incorporated, San Mateo, CA (US)

(72) Inventors: Scott Harris, Menlo Park, CA (US); Dmitri Korobov, San Francisco, CA (US)

(73) Assignee: Coupa Software Incorporated, San Mateo, CA (US)

( * ) Notice: Subject to any disclaimer, the term of this patent is extended or adjusted under 35 U.S.C. 154(b) by 51 days.

(21) Appl. No.: 17/135,485

(22) Filed: Dec. 28, 2020

(65) Prior Publication Data

US 2021/0117986 A1    Apr. 22, 2021

Related U.S. Application Data

(63) Continuation of application No. 16/198,715, filed on Nov. 21, 2018, now Pat. No. 10,896,430.

(51) Int. Cl.
*G06Q 30/00* (2023.01)
*G06Q 40/00* (2023.01)
(Continued)

(52) U.S. Cl.
CPC ..... *G06Q 30/0185* (2013.01); *G06Q 30/0609* (2013.01); *G06Q 30/0635* (2013.01); *G06Q 40/12* (2013.12)

(58) Field of Classification Search
None
See application file for complete search history.

(56) References Cited

U.S. PATENT DOCUMENTS

| | | |
|---|---|---|
| 6,219,538 B1 | 4/2001 | Kaminsky |
| 7,403,922 B1 | 7/2008 | Lewis |

(Continued)

OTHER PUBLICATIONS

Harris, U.S. Appl. No. 15/653,065, filed Jul. 18, 2017, Final Office Action, dated Feb. 7, 2019. (Year: 2019).*

(Continued)

*Primary Examiner* — Nicholas D Rosen
(74) *Attorney, Agent, or Firm* — Baker Botts L.L.P.

(57) ABSTRACT

A fraud detection system for detecting fraudulent acts related to payment discounts from digital transactional data is disclosed. In some embodiments, the fraud detection system is programmed or configured with data structures and/or database records that are arranged to detect an occurrence of a triggering event, such as receiving an early payment discount by a buyer account from a supplier account. The fraud detection system is programmed to analyze how a first amount charged for certain items by the supplier account to the buyer account before the triggering event has changed to a second amount after the triggering event from digital documents related to procurement transactions. The certain items may include items for sale or for other miscellaneous items. The digital documents may include catalogs, purchase requisitions, purchase orders, or invoices. The fraud detection system is programmed to further detect any potential fraud committed by the supplier account based on the analysis result. Finally, the fraud detection system is programmed to send a warning of the potential fraud to other buyer accounts that have been offered promotions, such as the early payment discounts, from the supplier account.

16 Claims, 8 Drawing Sheets

(51) Int. Cl.
*G06Q 30/06* (2023.01)
*G06Q 30/018* (2023.01)
*G06Q 30/0601* (2023.01)
*G06Q 40/12* (2023.01)

(56) References Cited

U.S. PATENT DOCUMENTS

| | | | |
|---|---|---|---|
| 7,610,040 B2 | 10/2009 | Cantini | |
| 7,668,769 B2 | 2/2010 | Baker | |
| 8,099,738 B2* | 1/2012 | Akiyama | G06F 9/451 719/318 |
| 8,352,366 B1 | 1/2013 | Keld | |
| 9,672,478 B2 | 6/2017 | B'Far | |
| 9,721,289 B2 | 8/2017 | Esekow | |
| 10,896,430 B1* | 1/2021 | Harris | G06Q 30/0635 |
| 11,157,850 B2* | 10/2021 | Harris | G06Q 10/06315 |
| 2004/0172360 A1 | 9/2004 | Mabrey | |
| 2007/0106582 A1 | 5/2007 | Baker | |
| 2008/0109826 A1* | 5/2008 | Akiyama | G06F 9/451 719/318 |
| 2009/0157454 A1 | 6/2009 | Carter | |
| 2010/0218134 A1 | 8/2010 | B'Far | |
| 2011/0196791 A1 | 8/2011 | Dominguez | |
| 2012/0109819 A1 | 5/2012 | Aidoo | |
| 2012/0244885 A1 | 9/2012 | Hefetz | |
| 2014/0344147 A1 | 11/2014 | Smith | |
| 2015/0379499 A1 | 12/2015 | Wang | |
| 2021/0256446 A1* | 8/2021 | Harris | G06F 16/23 |

OTHER PUBLICATIONS

Patterson, J.L., et al., "Understanding and Mitigating Supply Chain Fraud," Journal of Marketing Development and Competitiveness, col. 12, No. 1, pp. 70-83, May 2018. (Year: 2018).

Harris, U.S. Appl. No. 15/653,065, filed Jul. 18, 2017, Restriction Requirement, dated Sep. 13, 2017.

Harris, U.S. Appl. No. 15/653,065, filed Jul. 18, 2017, Office Action, dated Oct. 10, 2017.

Harris, U.S. Appl. No. 15/653,065, filed Jul. 18, 2017, Office Action, dated Jul. 13, 2018.

Harris, U.S. Appl. No. 15/653,065, filed Jul. 18, 2017, Interview Summary, dated Jan. 4, 2018.

Harris, U.S. Appl. No. 15/653,065, filed Jul. 18, 2017, Final Office Action, dated May 4, 2018.

Harris, U.S. Appl. No. 15/653,065, filed Jul. 18, 2017, Examiners Answers, dated Aug. 28, 2019.

Harris, U.S. Appl. No. 16/239,442, filed Jan. 3, 2019, Office Action, dated Jan. 24, 2020.

* cited by examiner

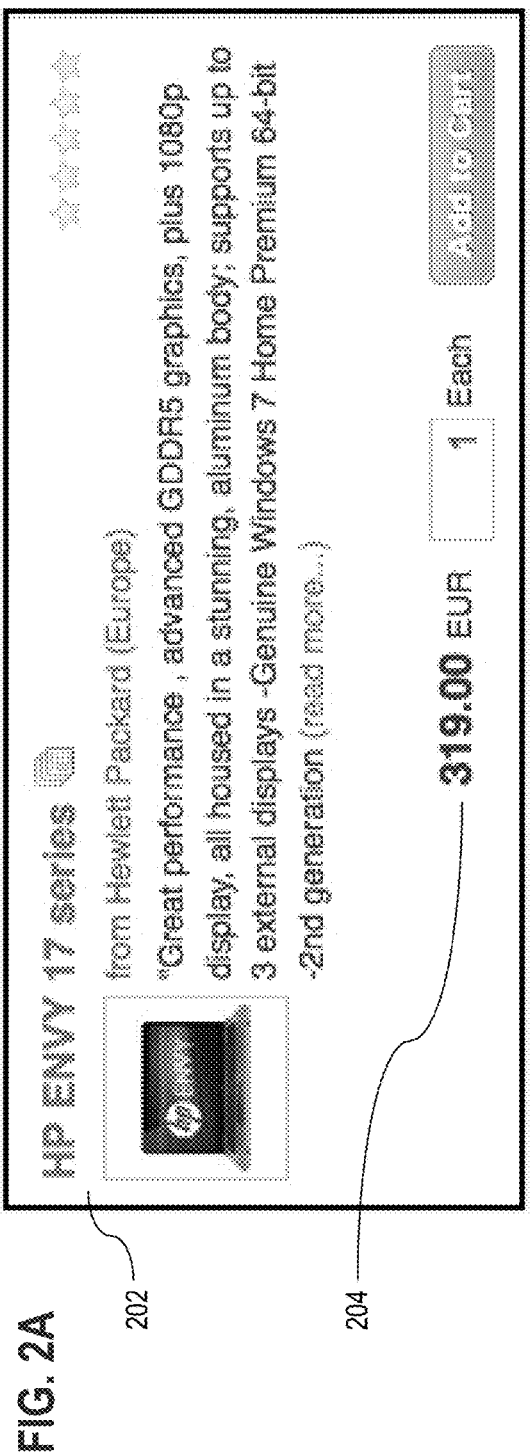

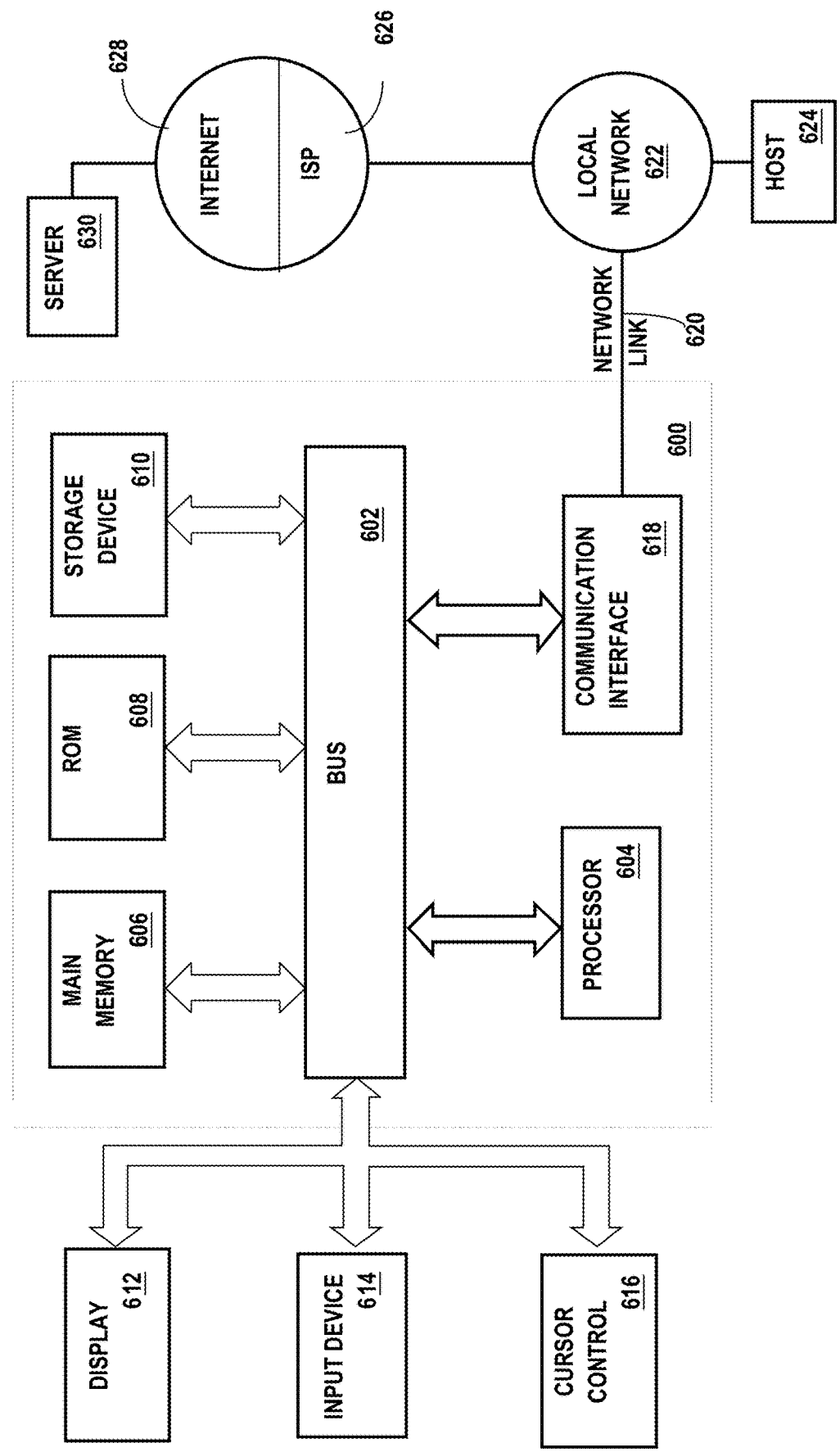

DETECTING SUPPLIER FRAUD FROM DIGITAL TRANSACTIONAL DATA

BENEFIT CLAIM

The present application claims the benefit under 35 U.S.C. § 120 as a continuation of application Ser. No. 16/198,715, filed 21 Nov. 2018, the entire contents of which are hereby incorporated by reference for all purposes as if fully set forth herein. Applicants rescind any disclaimer of subject matter in the parent application or prosecution history and advise the USPTO that the present claims may be broader than any other application in the chain of priority.

FIELD OF THE DISCLOSURE

One technical field of the present disclosure is digital data analysis, transmission, and display. Another technical field is detection of supplier fraud from digital data communicated between supplier devices and buyer devices in response to prior rewards to buyer accounts.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A buyer device associated with a buyer account and a supplier device associated with a supplier account communicate different digital documents during a procurement transaction, where a digital payment is ultimately made by the buyer account to the supplier account. The different digital documents may include a catalog generated by the supplier account, a purchase requisition or purchase order generated by the buyer account, or an invoice generated by the supplier account. An early payment discount or another reward may be offered by the supplier account to the buyer account, where the amount of the digital payment is reduced for an earlier payment date. However, a fraudulent act as reflected in one or more of the digital documents may also be committed by the supplier account to offset the reward. It would be helpful to detect such fraud and help the buyer account take cautionary or remedial measures.

BRIEF DESCRIPTION OF THE DRAWINGS

In the drawings:

FIG. 2A illustrates an example digital catalog.

FIG. 2B illustrates an example digital purchase requisition.

FIG. 2C illustrates an example digital purchase order.

FIG. 2D illustrates an example digital invoice.

FIG. 6 is a block diagram that illustrates a computer system upon which an embodiment of the invention may be implemented.

DETAILED DESCRIPTION

Figure 1:
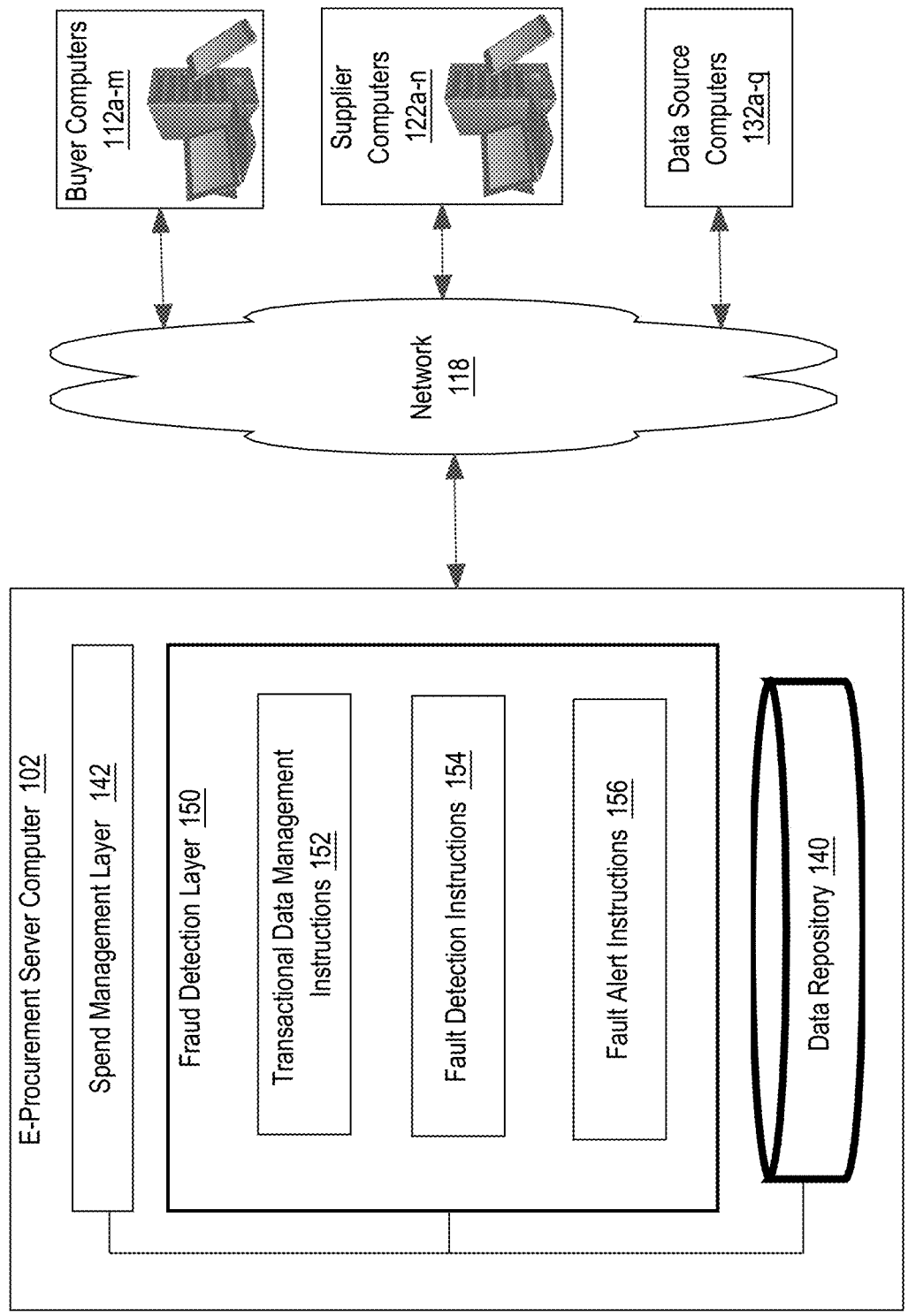
FIG. 1 illustrates an example networked computer system with which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:
1. GENERAL OVERVIEW
2. EXAMPLE COMPUTING ENVIRONMENTS AND COMPUTER COMPONENTS
3. FUNCTIONAL DESCRIPTIONS
   3.1. DETECTING POTENTIAL FRAUD BY A SUPPLIER ACCOUNT RELATED TO PAYMENT DISCOUNTS
      3.1.1. DECIDING FROM WHICH TRANSACTIONAL DATA TO DETECT POTENTIAL FRAUD
      3.1.2. DETERMINING WHEN TO DETECT POTENTIAL FRAUD
      3.1.3. DETERMINING WHAT TO CONSIDER AS POTENTIAL FRAUD
   3.2. ASSISTING A BUYER ACCOUNT WITH HANDLING POTENTIAL FRAUD
4. EXAMPLE PROCESSES
5. IMPLEMENTATION EXAMPLE—HARDWARE OVERVIEW
6. EXTENSIONS AND ALTERNATIVES

1. GENERAL OVERVIEW

A fraud detection system for detecting fraudulent acts related to payment discounts from digital transactional data is disclosed. In some embodiments, the fraud detection system is programmed or configured with data structures and/or database records that are arranged to detect an occurrence of a triggering event, such as receiving an early payment discount by a buyer account from a supplier account. The fraud detection system is programmed to analyze how a first amount charged for certain items by the supplier account to the buyer account before the triggering event has changed to a second amount after the triggering event from digital documents related to procurement transactions. The certain items may include items for sale or for other miscellaneous items. The digital documents may include catalogs, purchase requisitions, purchase orders, or invoices. The fraud detection system is programmed to further detect any potential fraud committed by the supplier account based on the analysis result and assist the buyer account with handling any potential fraud. Additionally, the fraud detection system is programmed to send a warning of the potential fraud to other buyer accounts that have been offered promotions, such as the early payment discounts, from the supplier account.

In some embodiments, the fraud detection system is programmed to manage a supplier account associated with a supplier device and a buyer account associated with a buyer device and facilitate procurement transactions between the two accounts. The fraud detection system is programmed to maintain digital documents created during a procurement transaction, such as a catalog provided by the supplier account, a purchase requisition generated by the buyer account based on the catalog, a purchase order generated by the buyer account based on the purchase requisition, or an invoice generated by the supplier account based on the purchase order. Such a digital document typically contains data related to one or more items for sale and one or more corresponding prices. Such a digital document may also contain data related to one or more miscellaneous items, such as shipping or handling, and one or more corresponding charges.

In some embodiments, the fraud detection system is programmed to detect the occurrence of a triggering event related to an early payment discount offered by the supplier account to the buyer account. For example, the triggering event can be the receipt of the early payment discount. Upon detecting the occurrence of the triggering event, the fraud detection system is programmed to analyze a first set those digital documents created during a first period before the triggering event and a second set of those digital documents created during a second period after the triggering event to determine whether the supplier account might be fraudulently charging the buyer account to recover the discount. The second period is normally shorter than the first period to focus on short-term behavior of the supplier account after the triggering event. More specifically, the fraud detection system is programmed to select certain items paid for by the buyer account after the triggering event, compute a first amount charged to the buyer account for the certain items from the first set of documents, and compute a second amount charged to the buyer account for the certain items from the second set of documents. The certain items could be items ordered most frequently by the buyer account after the triggering event or items that appeared on invoices generated by the supplier account but were not cataloged or backed by purchase orders generated by the buyer account, for example.

In some embodiments, the fraud detection system is programmed to then determine whether the second amount represents an unusually large increase from the first amount based on existing agreements between the supplier account and the buyer account, current trends in prices or charges negotiated between the supplier account and multiple buyer accounts, historical trends in prices or charges negotiated between the buyer account and the supplier account over time, or other factors. The fraud detection system is programmed to report to the buyer account an unusually large increase as potential fraud committed by the supplier account. The fraud detection system can be configured to send an immediate alert to the buyer device or block further payments from the buyer account to the supplier account until the potential fraud is resolved, for example. As result of the potential fraud, the fraud detection system can also be configured to extend the fraud detection effort to other buyer accounts engaging in procurement transactions with the supplier account, especially those buyer accounts which have also received early payment discounts from the supplier account.

The fraud detection system produces various technical benefits. By identifying unusually large increases in amounts charged by the supplier account to the buyer account soon after an early, reduced payment, the fraud detection system improves accuracy and integrity of digital transactional data between the supplier account and the buyer account and deters fraud by the supplier account caused by an early payment discount. By providing a warning of potential fraud to a buyer device or taking other remedial measures, the fraud detection system reduces wasted computing resources for processing and transmitting further transactional data communicated between the buyer device and the supplier device. By extending fraud detection efforts to other buyer accounts, the fraud detection provides similar benefits to more buyer accounts and further reduces wasted computing resources.

2. EXAMPLE COMPUTING ENVIRONMENTS AND COMPUTER COMPONENTS

FIG. 1 illustrates an example networked computer system with which various embodiments may be practiced. FIG. 1 is shown in simplified, schematic format for purposes of illustrating a clear example and other embodiments may include more, fewer, or different elements.

In some embodiments, the networked computer system comprises an e-procurement server computer 102 ("server"), one or more supplier computers 122$a$-$n$, one or more buyer computers 112$a$-$m$, and one or more data source computers 132, which are communicatively coupled directly or indirectly via one or more networks 118.

In some embodiments, the server 102 broadly represents one or more computers, such as a server farm, a cloud computing platform, or a parallel computer, virtual computing instances, and/or instances of a server-based application. The server 102 comprises a spend management layer 142 that is programmed or configured to host or execute functions including but not limited to managing buyer accounts associated with the one or more buyer computers 112$a$-$m$ and supplier accounts associated with the one or more supplier computers 122$a$-$n$, and facilitating generation and maintenance of digital documents during procurement transactions between buyer accounts and supplier accounts, such as catalogs, purchase requisitions, purchase orders, or invoices. The server 102 also comprises a fault detection layer 150 that is programmed or configured to host or execute functions including but not limited to detecting potential fraud by a supplier account in response to an early payment discount received by a buyer account from the supplier account and reporting the potential fraud to a buyer computer 112$a$ of the buyer account.

FIG. 1 also illustrates example components of the server 102 in accordance with the disclosed embodiments. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the fraud detection layer 150 can comprise computer-executable instructions, including transactional data management instructions 152, fraud detection instructions 154, and fraud alert instructions 156. In addition, the server 102 can comprise a database module 140.

In some embodiments, the transactional data management instructions 152 enable collecting and transmitting transactional data or documents, such as catalogs, purchase requisitions, purchase orders, or invoices, between supplier computers and buyer computers and maintaining the transactional data in memories. Specifically, the transaction data management instructions 152 enable managing the transactional data by semantic units, such as individual item descriptions or prices. For example, a catalog retrieved from a supplier computer can be parsed into these semantic units, or a graphical user interface can be presented for entering or selecting such semantic units in generating a purchase requisition. Additional metadata that may not be part of the transactional data can also be stored with the transactional data, such as the date of creation or the list of accounts accessing the transactional data.

In some embodiments, the fraud detection instructions 154 enable analyzing transactional data and identifying potential fraud by a supplier account in response to offering a payment discount to a buyer account. Specifically, the fraud detection instructions 154 enable evaluating amounts charged for specific items by a supplier account during a first period before a triggering event related to the payment discount and amounts charged for the specific items during a second period after the triggering event. The fraud detection instructions 154 further enable determining whether any increase in the amounts from before the triggering event to after the triggering event is significant enough to constitute potential fraud by the supplier account. The determination may also be based on additional transactional data associated with other supplier accounts or other buyer accounts.

In some embodiments, the fraud alert instructions 156 enable taking cautionary or remedial measures for potential fraud committed by a supplier account in response to offering a payment discount to a buyer account. These measures can include sending an alert to a buyer computer of the buyer account, blocking a payment from the buyer account to the supplier account, or initiating additional fraud detection for other buyer accounts that have received payment discounts from the supplier account.

In some embodiments, the database module 140 is programmed or configured to manage relevant data structures and store relevant data for functions performed by the server 102. In association with the fraud detection layer 150, the data may include supplier data, buyer data, transactional data including terms of early payment discounts, trends of prices or charges, fraud detection results, or fraud alerts.

In some embodiments, each of the buyer computers 112*a-m* broadly represents one or more computers, virtual computing instances, and/or instances of an e-procurement application program that are associated with an institution or entity that is related as a buyer with respect to a separate entity associated with one of the supplier computers 122*a-n*. A buyer computer 112*a* is programmed to create a buyer account with the server 102 and manage digital documents related to a buyer account during procurement transactions, such as receiving a catalog of items for sale from the server 102, generating or transmitting a purchase requisition or purchase order for some of the items for sale to the server 102, or receiving an invoice for some of the items for sale from the server 102. The buyer computer 112*a* may comprise a desktop computer, laptop computer, tablet computer, smartphone, wearable device, or any other type of computing device that is capable of proper communication with the server 102 as well as adequate local data processing and storage. In some cases, a buyer computer 112*a* may be a personal computer or workstation that hosts or executes a browser and communicates via HTTP and HTML, over the network 118 with a server-side e-procurement application hosted or executed at the server 102. In other cases, a buyer computer 112*a* may be a server-class computer and/or virtual computing instance that hosts or executes an instance of an e-procurement application that communicates programmatically via API calls, RPC or other programmatic messaging with the server 102.

Similarly, in some embodiments, each of the supplier computer 122*a-n* broadly represents one or more computers, virtual computing instances, and/or instances of an e-procurement application program that are associated with an institution or entity that is related as a supplier with respect to a separate entity associated with one of the buyer computer 112*a-m*. A supplier computer 122*a* is programmed to create a supplier account with the server 102 and manage digital documents related to a supplier account during procurement transactions, such as generating or transmitting a catalog of items for sale to the server 102, receiving a purchase order for some of the items for sale from the server 102, or generating or transmitting an invoice for some of the items for sale to the server 102. A supplier computer 122*a* may comprise a desktop computer, laptop computer, tablet computer, smartphone, wearable device, or any other type of computing device that is capable of proper communication with the server as well as adequate local data processing and storage. In some cases, a supplier computer 122*a* may be a personal computer or workstation that hosts or executes a browser and communicates via HTTP and HTML over network 118 with a server-side e-procurement application hosted or executed at the server 102. In other cases, a supplier computer 122*a* may be a server-class computer and/or virtual computing instance that hosts or executes an instance of an e-procurement application that communicates programmatically via API calls, RPC or other programmatic messaging with the server 102.

In some embodiments, each of the data source computer 132*a-q* broadly represents one or more computers, virtual computing instances, and/or instances of a data management application program with a communication interface. A data source computer 132*a* is programmed to manage one or more data sources, receive a request for certain data in the one or more data sources from the server 102, and send a response to the request to the server 102. The data source computer 132*a* can comprise any computing facility with sufficient computing power in data processing, data storage, and network communication for the above-described functions.

In some embodiments, the network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, through the fraud detection layer 150, the server 102 is programmed to receive or transmit transactional data, such as catalogs, purchase requisitions, purchase orders, or invoices, from the buyer computers 112*a-m* or the supplier computers 122*a-n*. The server 102 is programmed to also store such transactional data in a storage device, such as the data repository 140. Such transactional data may include terms of an early payment discount offered by a supplier account to a buyer account. The server 102 is programmed to further receive additional data from the data source computers 132*a-q* that can be used to assess the transactional data communicated between one of the supplier computer 122*a-n* and one of the buyer computers 112*a-m*. The additional data may include industry-wide prices of certain items sold by a supplier account or annual revenue or spending data associated with a buyer account. The server 102 is programmed to also store such additional data in a storage device, such as the data repository 140. Following the receipt of an early payment discount by a particular buyer account from a particular supplier account, the server 102 is programmed to detect any potential fraud by the particular supplier account of charging an unusually large amount for certain items compared to the amount charged before the receipt of the early payment discount by analyzing the stored transactional data and the additional data. The server 102 is programmed to then send a notification of any detected potential fraud to a particular buyer computer 112*a* of the particular buyer account or prevent any further engagement in a procurement transaction between the particular buyer account and the particular supplier account until the potential fraud is resolved. The server can also be programmed to send a request to the particular supplier computer 122*a* for resolving the potential fraud.

3. FUNCTIONAL DESCRIPTIONS

3.1. Detecting Potential Fraud by a Supplier Account Related to Payment Discounts In some embodiments, the fraud detection server computer (server) 102 is programmed to manage supplier accounts associated with suppliers and supplier computers and buyer accounts associated with buyers and buyer computers. A supplier account includes digital data related to a supplier and enables the selling of goods or services by the supplier, while a buyer account includes digital data related to a buyer and enables the purchasing of goods or services by the buyer. The server 102 is programmed to coordinate digital communications between supplier accounts and buyer accounts during procurement transactions, including facilitating the completion or transmission of specific transactional data or documents. The server 102 is programmed to also maintain configurations in the supplier accounts or buyer accounts, including buyer preferences related to detecting fraud by supplier accounts related to early payment discounts, as further discussed below. The configurations can be initialized to default values determined by the server 102 or set to values provided by a supplier account, a buyer account, or the server 102 at a given time.

3.1.1. Deciding from which Transactional Data to Detect Potential Fraud

In some embodiments, the server 102 is programmed to detect fraud from one or more types of transactional data or documents, such as a catalog generated by a supplier account, a purchase requisition generated by a buyer account, a purchase order generated by a buyer account, or an invoice generated by a supplier account.

FIG. 2 illustrates examples types of transactional data. FIG. 2A illustrates an example digital catalog. In some embodiments, the server 102 is programmed to enable a supplier account to create a catalog with the server 102 or retrieve a catalog from an external system associated with the supplier account. The server 102 is programmed to further transmit the catalog associated with the supplier account to a buyer computer associated with a buyer account. The catalog shows one or more items that can be purchased for specific prices. For example, the item identified by the description 202 can be purchased for the price 204. The server 102 is generally programmed to store at least part of the catalog in a storage device. For example, the description 202 and the price 204 can be stored, together with an identifier of the supplier account, an identifier of the buyer account, or the date the catalog was created.

FIG. 2B illustrates an example digital purchase requisition. In some embodiments, the server 102 is programmed to allow a buyer account to create a purchase requisition, generally based on a catalog associated with a supplier account. The purchase requisition shows one or more items for which there is a request to purchase for a specific price. For example, the item identified by the description 206 can be purchased for the price 208. The server 102 is generally programmed to store at least part of the purchase requisition in a storage device. For example, the description 206 and the price 208 can be stored, together with an identifier of the buyer account, an identifier of the supplier account, or the date the purchase requisition was created.

Figures 2C, 2D:
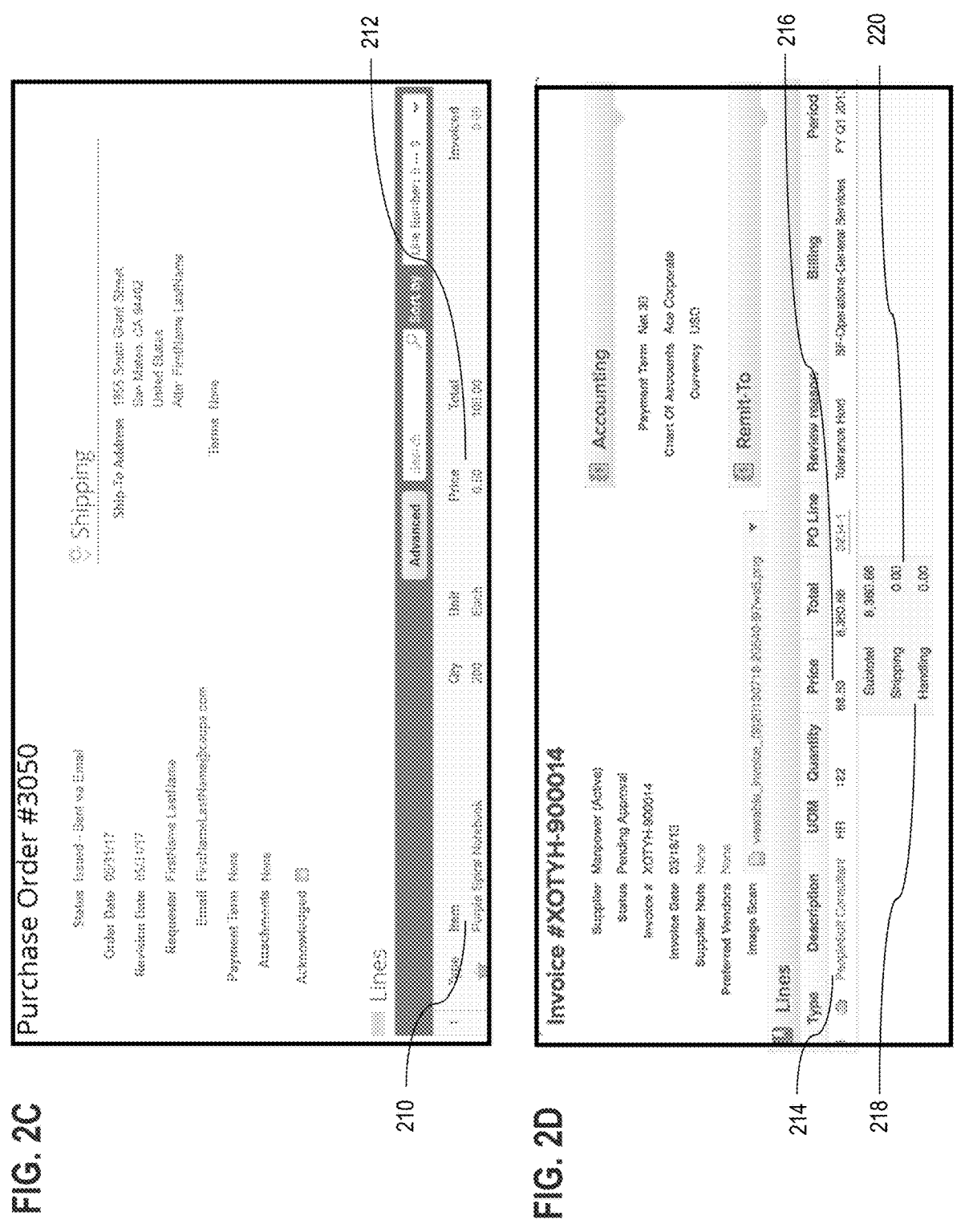

FIG. 2C illustrates an example digital purchase order. In some embodiments, the server 102 is programmed to allow a buyer account to create a purchase order, generally based on a purchase requisition previously generated by the buyer account. The server 102 is programmed to then transmit the purchase order to a supplier computer associated with the supplier account. The purchase order shows one or more items to be purchased (typically not yet paid for) by the buyer account from the supplier account for specific prices. For example, the item identified by the description 210 can be purchased for the price 212. The server 102 is generally programmed to store at least part of the purchase order in a storage device. For example, the description 210 and the price 212 can be stored, together with an identifier of the buyer account, an identifier of the supplier account, or the date the purchase order was created.

FIG. 2D illustrates an example digital invoice. In some embodiments, the server 102 is programmed to allow a supplier account to create an invoice, generally based on a purchase order generated by a buyer account. The server 102 is programmed to then transmit the invoice to the buyer computer. The invoice shows one or more items that have been purchased by the buyer account from the supplier account for specific prices. For example, the item identified by the description 214 can be purchased for the price 216. Some of the one or more items might not have been referenced in an earlier document from which the invoice is derived, such as an uncatalogued item not referenced in a catalog or an unbacked item not referenced in a purchase order. In addition, the invoice can show additional items associated additional amounts that do not correspond to individual items for sale or government-imposed fees. Some of the additional items also might not have been referenced in an earlier document from which the invoice is derived. For example, the shipping and handling identified by the description 218 that are associated with the amounts 220, which are considered as miscellaneous charges. The server 102 is generally programmed to store at least part of the invoice in a storage device. For example, the description 214, the price 216, the description 218, and the amounts 220 can be stored, together with an identifier of the supplier account, an identifier of the buyer account, or the date the invoice was created.

In some embodiments, the server 102 is programmed to compare specific data generated before and after a triggering event related to an early payment discount offered by a supplier account to a buyer account. The specific data can be the total price or other amount of one or more items in one or more types of transaction data or documents, such as a catalog, a purchase requisition, a purchase order, or an invoice. The one or more items typically referenced together in one digital document but can also be referenced in different digital documents. For example, a total amount of miscellaneous charges as indicated in an invoice generated before the triggering event can be compared with a total amount of miscellaneous charges as indicated in an invoice generated after the triggering event. For further example, the price of a specific printer as indicated in a catalog generated before the triggering event can be compared with the price of the specific printer as indicated in a catalog generated after the triggering event. The server 102 can be configured to select the one or more items such that the specific data generated after the triggering event exceed a certain threshold, such as $1,000.

In some embodiments, the server 102 is programmed to consider, for the specific data, only transactional data associated with the supplier account and the buyer account or also consider transactional data associated with other supplier accounts and other buyer accounts. For example, the price of a specific printer as indicated in a catalog generated by a supplier account before the triggering event and transmitted to a buyer computer of the buyer account can be compared with the price of the specific printer as indicated in a catalog generated by the supplier account after the triggering event and transmitted to the buyer computer. For further example, the price of the specific printer as indicated in a catalog generated by the supplier account before the triggering event and transmitted to multiple buyer computers of multiple buyer accounts can be compared with the price of the specific printer as indicated in a catalog generated by the supplier account after the triggering event and transmitted to the multiple buyer computers.

In some embodiments, the server 102 is programmed to compare specific data generated during a first period before the triggering event and generated during a second period after the triggering event. The first period is generally longer than the second period. For example, the first period can be one year immediately preceding the triggering event, and the second period can be three months immediately following the triggering event. For the first period or the second period, the server is programmed to determine a representative value for the specific data. The representative value can be an aggregate, such as an average or a median, over all values in the relevant digital documents created during the period of interest, over all the largest values in the relevant digital documents created during each unit of the period of interest, or over all the values exceeding a certain threshold in the relevant digital documents created during the period of interest. For example, the representative value of the price of a specific printer for the one year before the triggering event can be the average of the largest price of that specific printer as indicated in a catalog generated by the supplier account in each month of the one year. The server can be programmed to track representative values as new transactional data becomes available or calculate representative values as requested or necessary, such as at the end of the second period.

In some embodiments, the server 102 is programmed to select the items to be included in the specific data based on specific criteria. Instead of considering all the items that are likely to be covered in any transactional data associated with the supplier account or all the items that were purchased by the buyer account during the second period, the server can be programmed to select the specific data based on buying or pricing patterns of all the items during specific periods of time. For example, the specific criteria can describe those items that tend to be purchased most frequently, tend to be purchased in bulk, tend to have fluctuating prices, tend to be most expensive, tend to have smallest profit margins, were ordered towards the end of the first period (e.g., the last three months of a year), or have been specifically named by the buyer account. In addition, the specific criteria can be applied to procurement transactions between one or more supplier accounts, including the supplier account, and one or more buyer accounts, including the buyer account. For example, the specific data can include the price of a specific box of paper that is normally ordered for more than 10,000 units every two months by the buyer account. For further example, the specific data can include the price of a specific printer that has been purchased by the largest number of buyer accounts last year.

3.1.2. Determining When to Detect Potential Fraud

In some embodiments, the server 102 is programmed to identify a triggering event related to an early payment discount or other buyer rewards for fraud detection. The triggering event can be when the supplier account opts in to early payment discounts or when an agreement is made on an early payment discount between the supplier account and any buyer account on the multi-tenant platform of the server 102. The triggering event can be when the supplier account first incorporates the terms of an early payment discount into a digital communication or first receives an early payment for discounts with a specific buyer account or across all buyer accounts. The triggering event can be when an early payment is paid and a discount is received by a buyer account. The triggering event can be when the total amount of early payment discounts received from the supplier account within a certain period reaches a certain threshold. In addition, the triggering event can be when potential fraud by the supplier account is detected for another buyer account to whom an early payment discount has been paid by the supplier account, when a reputation of the supplier account drops below a certain threshold, when a certain revenue of the supplier account drops below a particular threshold, or when a certain amount of goods or services sold by the supplier account to the buyer account drops below a specific threshold.

3.1.3. Determining What to Consider as Potential Fraud

In some embodiments, in response to the triggering event, the server 102 is programmed to detect potential fraud by the supplier account. More specifically, the server 102 is programmed to compare specific data generated before and after the triggering event, as noted above, and determine whether the change meets a certain threshold. When the specific data is the total price of one or more specific items for sale, the server 102 can be configured to compare a first representative price before the triggering event and a second representative price after the triggering event. The server 102 can be configured to then declare an occurrence of potential fraud when the second representative price constitutes an increase from the first representative price for more than a fixed value or a certain percentage of the first representative price subject to certain constraints discussed below. When the specific data is the total amount of miscellaneous charges of items that do not correspond to individual items for sale or government-imposed fees, the server 102 can be configured to compare a first representative amount before the triggering event and a second representative amount after the triggering event. The server 102 can be configured to then declare an occurrence of potential fraud when the second representative amount constitutes an increase from the first representative amount for more than a fixed value or a certain percentage of the first representative amount subject to the constraints discussed below.

In some embodiments, the specific data can include a list of new items that were not referenced in a prior document from which the current document is supposed to be derived, as noted above. When the specific data is the total price of uncatalogued items that are referenced in a purchase requisition, a purchase order, or an invoice, the server 102 can be configured to compare a first representative price before the triggering event and a second representative price after the triggering event. The first representative price and the second representative price may correspond to different lists of uncatalogued items. The server 102 can be configured to then declare an occurrence of potential fraud when the second representative price constitutes an increase from the first representative price for more than a fixed value or a certain percentage of the first representative price subject to the constraints discussed below. When no uncatalogued items were found in relevant transactional data before the triggering event, an occurrence of potential fraud can be automatically declared. For example, before the triggering event, one or more uncatalogued items might often be referenced in an invoice for a total of around $70, while after the triggering event, one or more uncatalogued items might often be referenced in on an invoice for a total of around $100. Since the difference of $30 is more than 2% of $70, potential fraud can be declared.

In some embodiments, similarly, when the specific data is the total price of unbacked items that were not referenced in a purchase requisition or purchase order but were referenced in an invoice, the server 102 can be configured to compare a first representative price before the triggering event and a second representative price after the triggering event. The server 102 can be configured to then declare an occurrence of potential fraud when the second representative price constitutes an increase from the first representative price for more than a fixed value or a certain percentage of the first representative price subject to the constraints discussed below. When no unbacked items were found in relevant transactional data before the triggering event, an occurrence of potential fraud can be automatically declared.

In some embodiments, the server 102 is programmed to determine the certain percentage or another value in the certain threshold for determining whether there is a sufficiently large jump between the first representative amount corresponding to the first period before the triggering event to the second representative amount corresponding to the second period after the triggering event. The determination can be based on various factors. One factor is a level of tolerance for payment increase of the buyer account, such as 1% or 2%. Another factor is the total business volume, revenue, or spending of the buyer account. For example, when the total spending is relatively large, the certain percentage may be set to a relatively small value. Yet another factor includes the terms of the early payment discount, as a fraudulent act may aim for recovering such a discount. In addition, another factor is the general reputation of the supplier account. The percentage may be smaller when the supplier account is associated with known fraudulent acts than when the supplier is associated with a clean record. For example, for a bad reputation, a 1% increase may signal a potential fraud, while for a good reputation, a percentage higher than 1% may signal a potential fraud. Other factors may include historical trends pertaining to the supplier account or industrial standards, as further discussed below.

In some embodiments, the server 102 is programmed to examine various constraints on fraud detection based on existing agreements between the supplier account and the buyer account or digital data from other sources. A constraint can be based on an indication in an existing agreement of an expected increase in the price of an item for sale or the amount of miscellaneous charges over a certain period of time or a permission to include uncatalogued or unbacked items up to a certain number of items or a certain total price. Such a constraint would mean that any increase in monetary amounts or inclusion of additional items consistent with the existing agreement should not be flagged as potential fraud. Alternatively, the server 102 can be programmed to adjust the thresholds for determining whether such an increase or inclusion constitutes potential fraud based on the existing agreement. For example, when the existing agreement indicates that the price of a specific printer or a comparable model tends to increase by 5% each year, the server 102 can be configured to declare an occurrence of potential fraud only when the second representative price constitutes an increase from a first representative price for more than 5% of the first representative price.

In some embodiments, the server 102 is programmed to evaluate current or historical trends for the specific data, such as the total price of one or more specific items for sale, which may include uncatalogued or unbacked items, or the total amount of miscellaneous charges. A constraint can be based on an indication in a current trend across multiple buyer accounts engaging in procurement transactions with the supplier account of an increase in the total price of one or more specific items for sale or the total amount of miscellaneous charges or a permission to include uncatalogued or unbacked items up to a certain number of items or a certain total price. A constraint can also be based on an indication in a historical trend of an expected increase in the total price of one or more specific items for sale or the total amount of miscellaneous charges over a certain period of time or a permission to include uncatalogued or unbacked items up to a certain number of items or a certain total price over a certain period of time. The historical trend could be calculated over the procurement transactions between the supplier account and the buyer account, all transactions associated with the supplier account, or all transactions associated with similar supplier accounts or across a specific industry. The server 102 can thus be programmed to exclude an increase in monetary amounts or an inclusion of additional items consistent with the current or historical trends as potential fraud. The server 102 can also be programmed to still flag the increase or inclusion as potential fraud but also inform the buyer account of the current or historical trends to enable the buyer account to perform further evaluation. Alternatively, the server 102 can be programmed to adjust the thresholds for determining whether such an increase or inclusion constitutes potential fraud based on the current or historical trends.

3.2. Assisting a Buyer Account With Handling Potential Fraud

In some embodiments, the server 102 is programmed to report potential fraud to the buyer account. The report can include information identifying a supplier account or a triggering event. The report can include further information related to the detection of the potential fraud, such as a type of transactional data or document, the one or more items included in the specific data, one or more documents of the first set of documents, one or more documents of the second set of documents, a total number of payments made for the one or more items after the triggering event, the first period before the triggering event, the second period after the triggering event, the first representative price or amount, or a second representative price or amount, a threshold on the difference between the second representative price or amount and the first representative price or amount, relevant terms from an existing agreement, or relevant current or historical trends. The further information can be presented in response to a request from a buyer computer of the buyer account for supporting evidence.

In some embodiments, the server 102 is programmed to report potential fraud as soon as the potential fraud is detected. Alternatively, potential fraud can be reported when the total fraudulent amount charged by the supplier account to the buyer account since the last report has exceeded a certain threshold or according to a specific schedule. The server 102 is programmed to send a report of the potential fraud to the buyer computer. The server 102 can also be programmed to save the report in the buyer account and send a notification of the report to the buyer computer.

In some embodiments, the server 102 is programmed to cause showing a warning or an alert in coordinating digital communications between the buyer account and the supplier account following the detection of potential fraud. The digital communications can include the buyer account requesting information regarding the supplier account, the buyer account requesting or receiving a catalog generated by the supplier account, the buyer account preparing a purchase requisition or a purchase order based on the catalog, or the buyer account receiving an invoice from the supplier account based on the purchase order. The warning can be transmitted to the buyer computer in association with any of these digital communications. For example, the warning can be shown in a graphical user interface before allowing the buyer computer to review a catalog or an invoice or generate a purchase requisition or a purchase order. For further example, in response to a request by the buyer computer to submit a purchase requisition or a purchase order or to make a payment in accordance with an invoice, the warning can be shown together with a request for confirmation. The server 102 can also be programmed to block any payment from the buyer account to the supplier account until the potential fraud is resolved or until a specific request to unblock payment is received from the buyer computer.

In some embodiments, as a result of detecting the potential fraud, the server 102 is programmed to send a request to a supplier computer of the supplier account for resolving potential fraud. The server 102 can also be programmed to perform fraud detection for other buyer accounts, especially those that have received early payment discounts from the supplier account.

Figure 3:
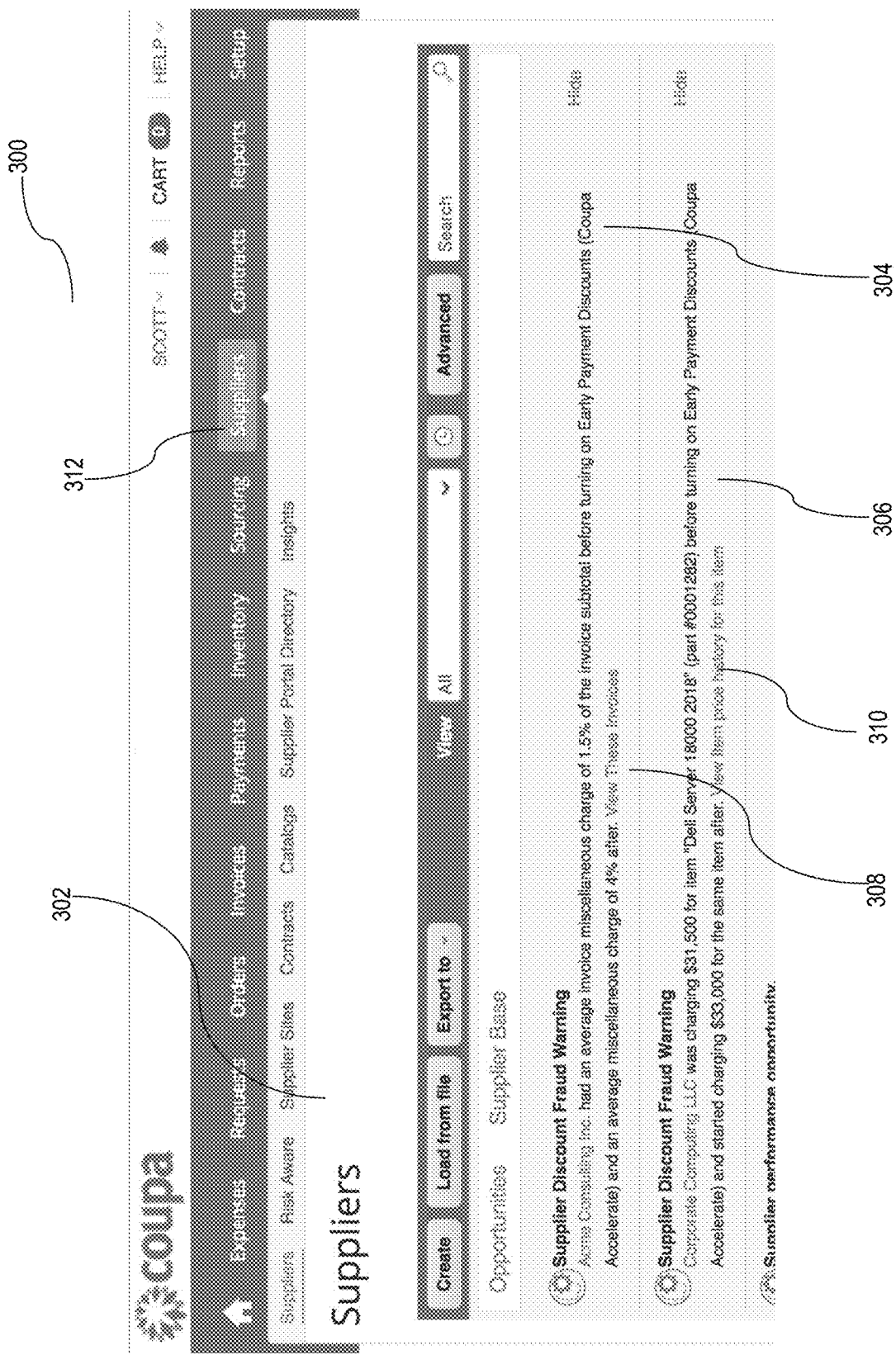
FIG. 3 illustrates an example screen of a graphical user interface that is programmed for communicating supplier data to a buyer device.

FIG. 3 illustrates an example screen of a graphical user interface that is programmed for communicating supplier data to a buyer device. In some embodiments, the screen 300 includes supplier data 302 presented to a buyer device. The supplier data 302 may be presented in response to a selection of the menu option 312, for example. This supplier data 302 may contain information regarding any supplier account managed by the server 102 or only a supplier account that has communicated with the buyer account associated with the buyer device through the server 102. The supplier data 302 may include a warning regarding potential fraud related to a payment discount. Each warning may indicate the supplier account, the specific data used to detect the potential fraud, the triggering event, the reason for declaring an occurrence of the potential fraud, or other related data. For example, the warning 304 concerns potential fraud detected from an increase of miscellaneous charges from 1.5% to 4% of the total invoice amount after the supplier account turned on a preference for early payment discounts, while the warning 306 concerns potential fraud detected from an increase of the price of a specific item from $31,500 to $33,000 similarly after the supplier account turned on a preference for early payment discounts. In addition, each warning may include an option for reviewing supporting data. For example, as miscellaneous charges are generally only shown in invoices and are not tied to specific items, the warning 304 includes a link 308 for viewing relevant invoices. For further example, the warning 306 includes a link 310 for viewing a history of the price of the item, which could be originally included in invoices or other transactional data.

Figure 4A:
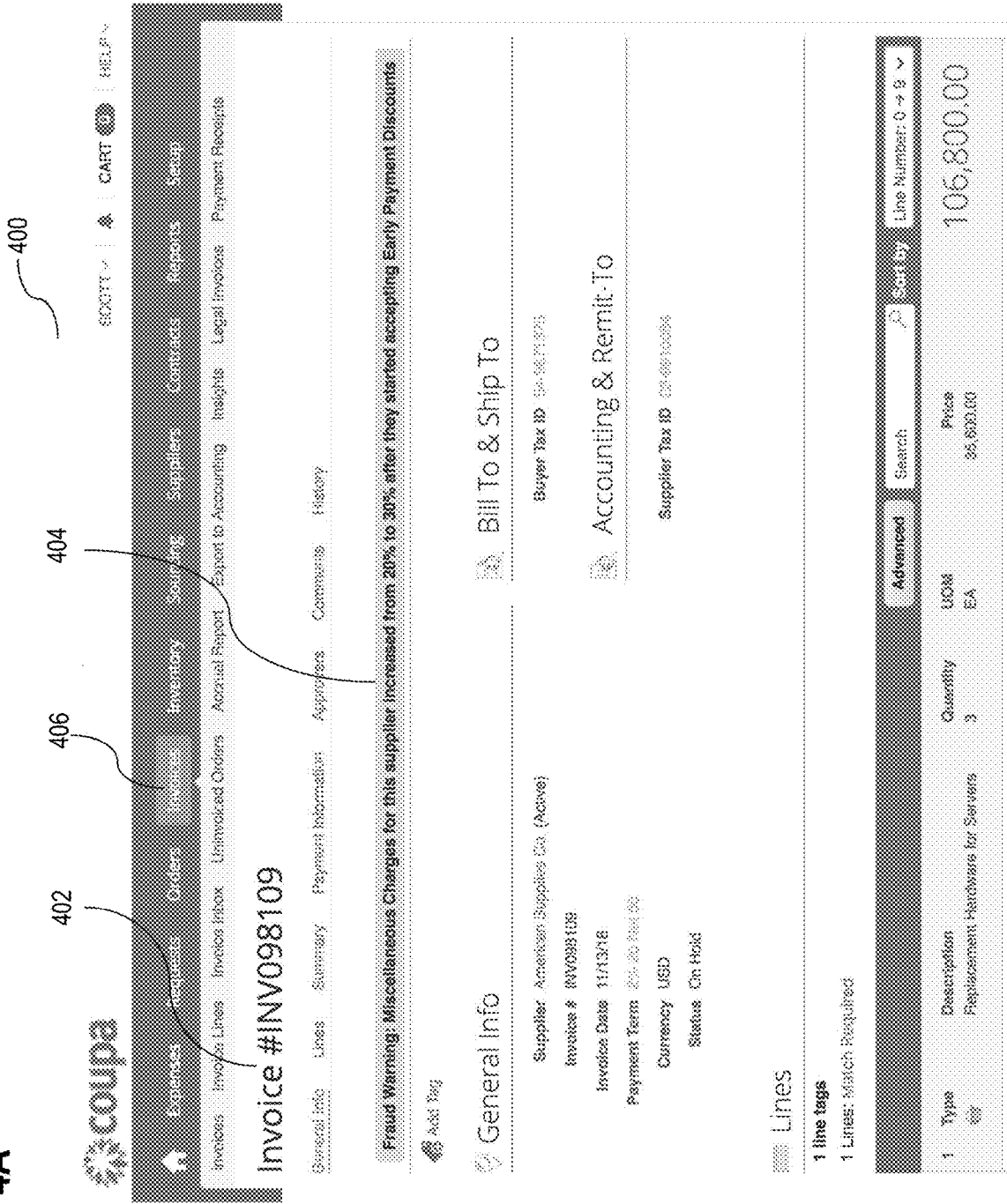
FIG. 4A illustrates an example screen of a graphical user interface that is programmed for communicating a digital communication to a buyer device.

FIG. 4A illustrates an example screen of a graphical user interface that is programmed for communicating a digital communication to a buyer device. In some embodiments, the screen 400 includes an invoice 402 from a supplier account to the buyer account associated with the buyer device. The invoice 402 can be presented in response to a selection of the menu option 406, for example. Such an invoice could include a warning of potential fraud committed by the supplier account, and the warning can include indicate the specific data used to detect the potential fraud, the triggering event, the reason for declaring an occurrence of the potential fraud, or other related data. The warning is typically shown in a manner that cannot be missed or at least is easy to detect. For example, the warning can be shown in a special font near the top of the default tab associated with the invoice. In this example, the invoice 402 includes a warning 404 that concerns potential fraud detected from an increase of miscellaneous charges from 20% to 30% of the total invoice amount after the supplier account started accepting early payments for discounts. Such a warning may enable a buyer to review the invoice or decide whether to make a payment more carefully. The warning 404 can also include a link for reviewing supporting data or other options, such as sending a request or instruction to the server 102 or contacting the supplier account.

Figure 4B:
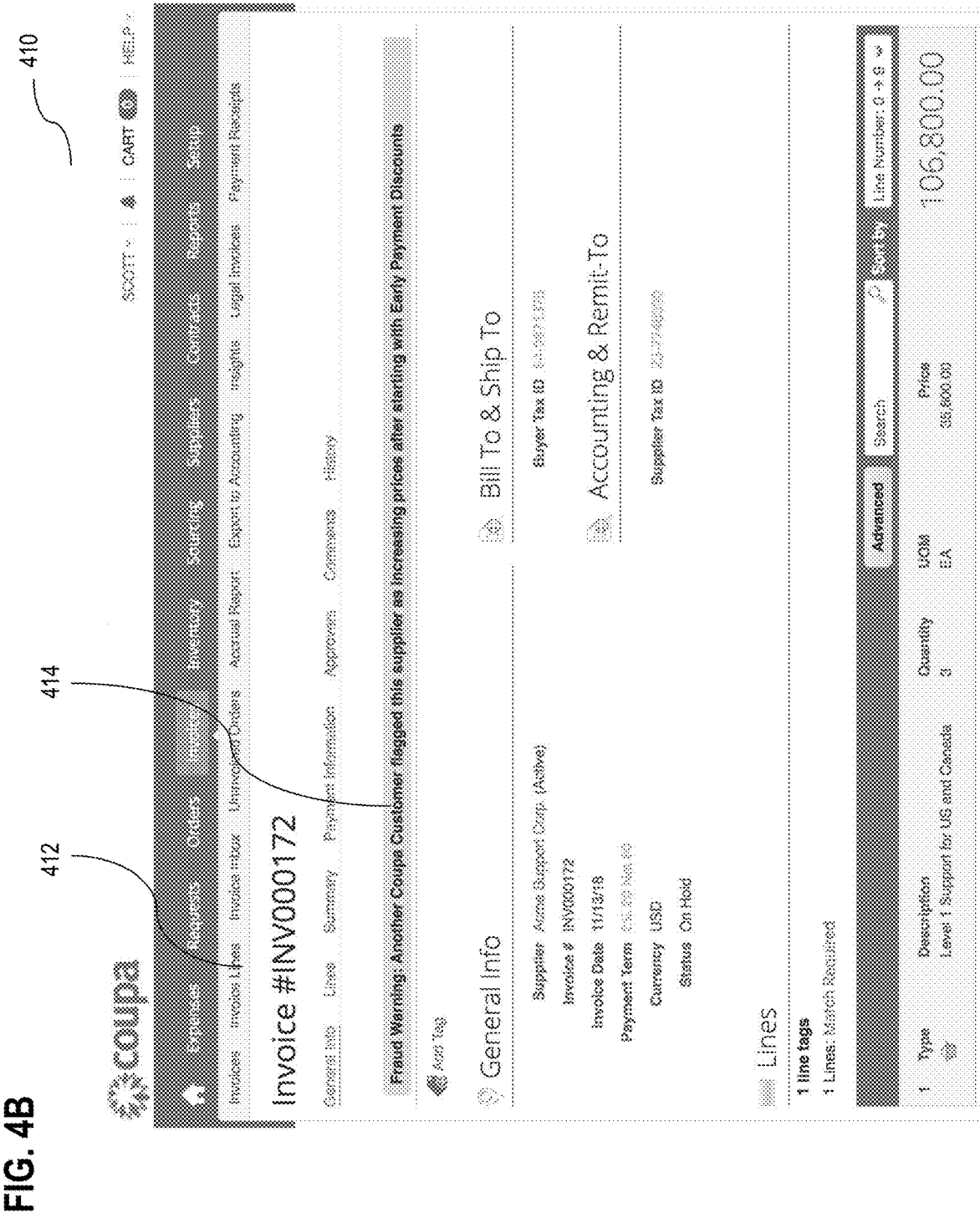
FIG. 4B illustrates an example screen of a graphical user interface that is programmed for communicating another digital communication to a buyer device.

FIG. 4B illustrates an example screen of a graphical user interface that is programmed for communicating another digital communication to a buyer device. In some embodiments, the screen 410 includes an invoice 412 from a supplier account to the buyer account associated with the buyer device. In this example, the invoice 412 includes a warning 414 that concerns potential fraud detected by a second buyer account from an increase of the prices of certain items after the supplier account started accepting early payments for discounts. For the buyer account associated with buyer device, the triggering event may thus be the reporting of potential fraud by the second buyer account. The warning 414 can include an option for sending a confirmation to the server 102 for detecting potential fraud for this buyer account.

4. EXAMPLE PROCESSES

Figure 5:
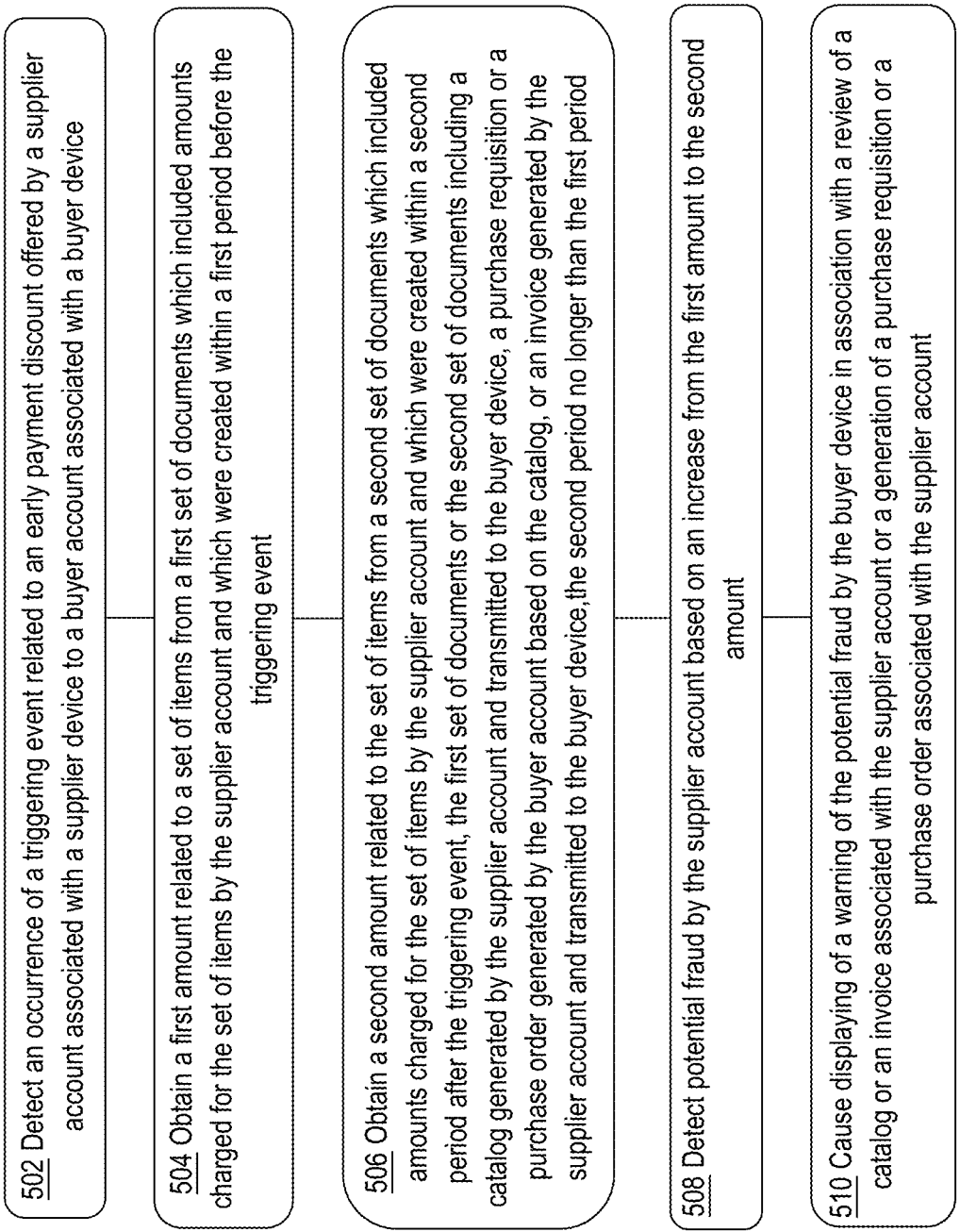
FIG. 5 illustrates an example process performed by the fraud detection server computer of detecting potential fraud related to an early payment discount.

FIG. 5 illustrates an example process performed by the fraud detection server computer of detecting potential fraud related to an early payment discount. FIG. 5 is shown in simplified, schematic format for purposes of illustrating a clear example and other embodiments may include more, fewer, or different elements connected in various manners. FIG. 5 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In some embodiments, in step 502, the server 102 is programmed or configured to detect an occurrence of a triggering event related to an early payment discount offered by a supplier account associated with a supplier device to a buyer account associated with a buyer device. The triggering event can be creating an agreement of the early payment discount between the supplier account and the buyer account, making an early payment and thus receiving an eligible discount by the buyer account, or detecting potential fraud by the supplier account related to a second early payment discount offered to second buyer account.

In some embodiments, in step 504, the server 102 is programmed or configured to obtain a first amount related to a set of items from a first set of documents which included amounts charged for the set of items by the supplier account and which were created within a first period before the triggering event. In step 506, the server 102 is programmed or configured to obtain a second amount related to the set of items from a second set of documents which included amounts charged for the set of items by the supplier account and which were created within a second period after the triggering event.

In some embodiments, the first set of documents or the second set of documents includes a catalog generated by the supplier account and transmitted to the buyer device, a purchase requisition or a purchase order generated by the buyer account based on the catalog, or an invoice generated by the supplier account and transmitted to the buyer device. In certain embodiments, the first set of documents and the second set of documents have a common document type out of a catalog, a purchase requisition, a purchase order, or an invoice. The second period is typically no longer than the first period. In certain embodiments, the second period immediately follows the triggering event and is relatively brief to detect potential fraud that is more likely tied to the triggering event.

In some embodiments, the set of items includes goods or services for sale by the supplier account. The first amount would then be a total price of the goods or services. The first amount can be an aggregate over all total prices included in the first set of documents, and the second amount can similarly be an aggregate over all total prices included in the second set of documents. In certain embodiments, the set of items includes goods or services for sale that were not cataloged or were not backed by purchase requisitions or purchase orders. In certain embodiments, the set of items includes items that were purchased by the buyer account during the second period and also purchased most frequently, that were purchased for more than a certain number of units in at least a certain number of orders, that were purchased for the highest prices, that were purchased most recently, or that were named by the buyer account during first period or the second period. In other embodiments, the set of items includes miscellaneous items that do not correspond to items for sales or government fees. Each of the first amount and the second amount would then be a total amount charged for these miscellaneous items.

In some embodiments, in step 508, the server 102 is programmed or configured to detect potential fraud by the supplier account based on an increase from the first amount to the second amount. The server 102 may be configured to declare an occurrence of potential fraud when the increase is more than a certain percentage of the first amount, except when the increase is within a range allowed in an existing agreement, by a current trend across in prices or charges negotiated between the supplier account and multiple buyer accounts over a particular period shorter than the first period, or by a historical trend in prices or charges negotiated between the supplier account and the buyer account over a specific period before the occurrence of the triggering event and longer than the first period. The certain percentage can be determined based on a reputation score associated the supplier account, whether the set of items includes an item that is uncatalogued or unbacked by a purchase requisition or a purchase order, an amount of the early payment discount, or a total revenue or spending of the buyer account.

In some embodiments, in step 510, the server 102 is programmed or configured to cause displaying of a warning of the potential fraud by the buyer device in association with a review of a catalog or an invoice associated with the supplier account or a generation of a purchase requisition or a purchase order associated with the supplier account. In certain embodiments, the server 102 can be configured to block any further payment from the buyer account to the supplier account until the potential fraud is resolved or until a specific request to unblock payment is received from the buyer device. In other embodiments, the server 102 can be configured to send a request to the supplier device for resolving the potential fraud.

In some embodiments, the server 102 is programmed to transmit the warning to the buyer device upon detecting the potential fraud, upon a request from the buyer device for an account status, or according to a specific schedule. The warning can indicate the supplier account, the set of items, a difference between the second amount and the first amount, one or more documents of the first set of documents, one or more documents of the second set of documents, or a total number of payments made by the buyer account for the set of items after the triggering event.

5. IMPLEMENTATION EXAMPLE—HARDWARE OVERVIEW

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM, and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device.

An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface 618 provides a two-way data communication coupling to network link(s) 620 that are directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server computer 630 may be coupled to internet 628. Server 630 broadly represents any computer, data center, virtual machine or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or no SQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6.0. EXTENSIONS AND ALTERNATIVES

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method of detecting potential fraud by supplier accounts and reporting the potential fraud to buyer accounts comprising:
    using a server computer coupled to a network to buyer computers and supplier computers, the server computer comprising one or more processors and one or more non-transitory computer-readable storage media storing one or more sequences of instructions configured when executed to manage the buyer accounts associated with the buyer computers and the supplier accounts associated with the supplier computers, generate and maintain digital documents during procurement transactions between the buyer accounts and the supplier accounts, detecting an occurrence of a triggering event related to a first promotion offered by a supplier account associated with a supplier system to a first buyer account associated with a first buyer system;
    obtaining, by the server computer, a first amount related to one or more items from a first set of documents which include amounts charged for the one or more items by the supplier account and which were created within a first period before the triggering event;
    obtaining, by the server computer, a second amount related to the one or more items from a second set of documents which include amounts charged for the one or more items by the supplier account and which were created within a second period after the triggering event, wherein the second period is greater than or equal to the first period;
    using a fault detection layer of the server computer comprising instructions configured to detect the potential fraud by the supplier account in response to an early payment discount received by the first buyer account from the supplier account and reporting the potential fraud to a buyer computer of the first buyer account, detecting, by the server computer, the potential fraud by the supplier account based on an increase from the first amount from before the triggering event to the second amount after the triggering event by determining whether the increase is more than a certain percentage of the first amount;
    determining, by the server computer, one or more second buyer accounts that are associated with respective second buyer systems and that have been offered promotions by the supplier account;
    using the server computer, communicating via HTTP and HTML, with the one or more multiple second buyer systems and presenting to a browser a graphical user interface for reviewing a catalog or an invoice associated with the supplier account or a generation of a purchase requisition or a purchase order associated with the supplier account;
    using the server computer, causing a display of a warning of the potential fraud at the graphical user interface of the one or more multiple second buyer systems in association with the display of the reviewing of the catalog or the invoice associated with the supplier account or the generation of the purchase requisition or the purchase order associated with the supplier account with a link for viewing one or more of relevant invoices, a history of a price of an item, or supporting data; and performing, by the server computer, at least one of: blocking any payment from a second buyer account of the one or more second buyer accounts to the supplier account until the potential fraud is resolved or until a specific request to unblock payment is received from a second buyer system of the one or more second buyer systems; and initiating, for the one or more of the second buyer accounts, additional fraud detection of the supplier account.

2. The computer-implemented method of claim 1, the triggering event comprising creating an agreement of the first promotion between the supplier account and the first buyer account, or making an early payment and thus receiving an eligible discount as the first promotion by the first buyer account in accordance with the agreement.

3. The computer-implemented method of claim 1, further comprising obtaining the first amount related to the one or more items comprising goods or services for sale; and obtaining the first amount comprising a first total price of the goods or services or obtaining the second amount comprising a second total price of the goods or services.

4. The computer-implemented method of claim 1, further comprising obtaining the first amount related to the one or more items including one or more miscellaneous items that do not correspond to goods or services for sale or government fees; and obtaining the first amount comprising a total amount charged for the one or more miscellaneous items or obtaining the second amount comprising a total amount charged for the one or more miscellaneous items.

5. The computer-implemented method of claim 1, further comprising selecting, as the one or more items, items that were purchased most frequently, that were purchased for more than a certain number of units in at least a certain number of orders, that were purchased for the highest prices, that were purchased most recently, or that were named by the first buyer account during the first period or the second period out of a group of items purchased by the first buyer account during the second period.

6. The computer-implemented method of claim 1, further comprising detecting the potential fraud based on one or more of: receiving a reputation score associated with the supplier account, whether the one or more items includes an item that is uncatalogued or unbacked by the purchase requisition or the purchase order, an amount of the promotion, or a total revenue or spending of the first buyer account.

7. The computer-implemented method of claim 1, further comprising detecting the potential fraud by one or more of: determining whether the increase is within a range allowed in an existing agreement, by a current trend in prices or charges negotiated between the supplier account and multiple buyer accounts over a particular period shorter than the first period, or by a historical trend in prices or charges negotiated between the supplier account and the first buyer account over a specific period before the triggering event and longer than the first period.

8. The computer-implemented method of claim 1, further comprising causing a second display of the warning of the potential fraud at the first buyer system in association with a second review of a second catalog or a second invoice that is associated with the supplier account or a second generation of a second purchase requisition or a second purchase order associated with the supplier account.

9. The computer-implemented method of claim 1, further comprising causing a display, with the warning, of data that was used to detect the potential fraud, the triggering event, or a reason for declaring an occurrence of the potential fraud.

10. The computer-implemented method of claim 1, further comprising causing a display, with the warning, of an option which when selected by the second buyer system of the one or more second buyer systems causes sending a confirmation allowing the additional fraud detection of the supplier account for the second buyer account.

11. One or more non-transitory storage media storing instructions which, when executed by one or more computing devices, cause performance of a method of detecting potential fraud by supplier accounts and reporting the potential fraud to buyer accounts, the method comprising:

using a server computer coupled to a network to buyer computers and supplier computers, the server computer comprising one or more processors and one or more non-transitory computer-readable storage media storing one or more sequences of instructions configured when executed to manage the buyer accounts associated with the buyer computers and the supplier accounts associated with the supplier computers, generate and maintain digital documents during procurement transactions between the buyer accounts and the supplier accounts, detecting an occurrence of a triggering event related to a first promotion offered by a supplier account associated with a supplier system to a first buyer account associated with a first buyer system;

obtaining, by the server computer, a first amount related to one or more items from a first set of documents which include amounts charged for the one or more items by the supplier account and which were created within a first period before the triggering event;

obtaining, by the server computer, a second amount related to the one or more items from a second set of documents which include amounts charged for the one or more items by the supplier account and which were created within a second period after the triggering event, wherein the second period is greater than or equal to the first period;

using a fault detection layer of the server computer comprising instructions configured to detect the potential fraud by the supplier account in response to an early payment discount received by the buyer account from the supplier account and reporting the potential fraud to a buyer computer of the buyer account, detecting, by the server computer, the potential fraud by the supplier account based on an increase from the first amount from before the triggering event to the second amount after the triggering event by determining whether the increase is more than a certain percentage of the first amount;

determining, by the server computer, one or more second buyer accounts that are associated with respective second buyer systems and that have been offered promotions by the supplier account;

using the server computer, communicating via HTTP and HTML, with the one or more multiple second buyer systems and presenting to a browser a graphical user interface for reviewing a catalog or an invoice associated with the supplier account or a generation of a purchase requisition or a purchase order associated with the supplier account;

using the server computer, causing a display of a warning of the potential fraud at the graphical user interface of the one or more multiple second buyer systems in association with the display of the reviewing of the catalog or the invoice associated with the supplier account or the generation of the purchase requisition or the purchase order associated with the supplier account with a link for viewing one or more of relevant invoices, a history of a price of an item, or supporting data; and performing, by the server computer, at least one of: blocking any payment from a second buyer account of the one or more second buyer accounts to the supplier account until the potential fraud is resolved or until a specific request to unblock payment is received from a second buyer system of the one or more second buyer systems; and initiating, for the one or more of the second buyer accounts, additional fraud detection of the supplier account.

12. The one or more non-transitory storage media of claim 11, the triggering event comprising creating an agreement of the first promotion between the supplier account and the first buyer account, or making an early payment and thus receiving an eligible discount as the first promotion by the first buyer account in accordance with the agreement.

13. The one or more non-transitory storage media of claim 11, further comprising instructions which, when executed by the one or more computing devices, cause performance of detecting the potential fraud based on one or more of: receiving a reputation score associated with the supplier account, whether the one or more items includes an item that is uncatalogued or unbacked by the purchase requisition or the purchase order, an amount of the promotion, or a total revenue or spending of the first buyer account.

14. The one or more non-transitory storage media of claim 11, further comprising instructions which, when executed by the one or more computing devices, cause performance of sending a request to a supplier device for resolving the potential fraud.

15. The one or more non-transitory storage media of claim 11, further comprising instructions which, when executed by the one or more computing devices, cause performance of causing a display, with the warning, of data that was used to detect the potential fraud, the triggering event, or a reason for declaring an occurrence of the potential fraud.

16. The one or more non-transitory storage media of claim 11, further comprising instructions which, when executed by the one or more computing devices, cause performance of causing a display, with the warning, of an option which when selected by the second buyer system of the one or more second buyer systems causes sending a confirmation allowing the additional fraud detection of the supplier account for the second buyer account.

\* \* \* \* \*